US010525423B2

(12) United States Patent
Wang et al.

(10) Patent No.: US 10,525,423 B2
(45) Date of Patent: Jan. 7, 2020

(54) NANOFILTRATION MEMBRANE AND METHOD OF MANUFACTURING A NANOFILTRATION MEMBRANE

(71) Applicants: Nanyang Technological University, Singapore (SG); Evoqua Water Technologies Pte. Ltd., Singapore (SG)

(72) Inventors: Rong Wang, Singapore (SG); Lei Shi, Singapore (SG); Laurentia Setiawan, Singapore (SG)

(73) Assignees: Nanyang Technological University, Singapore (SG); Evoqua Water Technologies Pte. Ltd., Singapore (SG)

(*) Notice: Subject to any disclaimer, the term of this patent is extended or adjusted under 35 U.S.C. 154(b) by 420 days.

(21) Appl. No.: 14/783,815

(22) PCT Filed: Apr. 10, 2014

(86) PCT No.: PCT/SG2014/000157
§ 371 (c)(1),
(2) Date: Oct. 9, 2015

(87) PCT Pub. No.: WO2014/168584
PCT Pub. Date: Oct. 16, 2014

(65) Prior Publication Data
US 2016/0303522 A1  Oct. 20, 2016

Related U.S. Application Data

(60) Provisional application No. 61/810,409, filed on Apr. 10, 2013.

(51) Int. Cl.
*B01D 71/64* (2006.01)
*B01D 71/60* (2006.01)
(Continued)

(52) U.S. Cl.
CPC ........... *B01D 71/64* (2013.01); *B01D 61/027* (2013.01); *B01D 67/0006* (2013.01);
(Continued)

(58) Field of Classification Search
None
See application file for complete search history.

(56) References Cited

U.S. PATENT DOCUMENTS 5,972,080 A * 10/1999 Nagata ............... C08G 73/10
95/54
2006/0281829 A1* 12/2006 Bissinger ............. A61K 6/10
523/109

(Continued)

FOREIGN PATENT DOCUMENTS

WO  2007/125367 A1  11/2007
WO  2010/111755 A2  10/2010

OTHER PUBLICATIONS

PAI PES hollow fiber membranes.pdf—"Development and positron annihilation spectroscopy (PAS) characterization of polyamide imide (PAI)—polyethersulfone (PES) . . . "—Li, Fu Yun et al—Journal of Membrane Science (Year: 2011).*

(Continued)

*Primary Examiner* — Bradley R Spies
(74) *Attorney, Agent, or Firm* — Seed IP Law Group LLP

(57) ABSTRACT

A nanofiltration membrane comprising a selective layer comprising or consisting of poly(amide-imide) cross-linked with polyallylamine is provided. A method of manufacturing a nanofiltration membrane and use of a nanofiltration membrane in a water softening process that is carried out at a low pressure of less than about 2 bar are also provided.

19 Claims, 5 Drawing Sheets

(51) Int. Cl.
| | |
|---|---|
| B01D 61/02 | (2006.01) |
| B01D 69/08 | (2006.01) |
| B01D 69/12 | (2006.01) |
| B01D 71/68 | (2006.01) |
| B01D 67/00 | (2006.01) |
| C02F 1/44 | (2006.01) |
| B29C 48/11 | (2019.01) |
| B29C 48/21 | (2019.01) |
| B29C 48/00 | (2019.01) |
| B01D 71/76 | (2006.01) |
| C08G 81/02 | (2006.01) |
| B29K 79/00 | (2006.01) |
| B29L 31/14 | (2006.01) |
| B29L 31/00 | (2006.01) |
| C02F 101/10 | (2006.01) |
| C02F 103/02 | (2006.01) |

(52) U.S. Cl.
CPC ......... *B01D 69/085* (2013.01); *B01D 69/088* (2013.01); *B01D 69/12* (2013.01); *B01D 71/60* (2013.01); *B01D 71/68* (2013.01); *B01D 71/76* (2013.01); *B29C 48/022* (2019.02); *B29C 48/11* (2019.02); *B29C 48/21* (2019.02); *C02F 1/442* (2013.01); *C08G 81/028* (2013.01); B01D 2323/30 (2013.01); B29K 2079/085 (2013.01); B29L 2031/14 (2013.01); B29L 2031/755 (2013.01); C02F 2101/10 (2013.01); C02F 2103/02 (2013.01)

(56) References Cited

U.S. PATENT DOCUMENTS

| | | | |
|---|---|---|---|
| 2008/0053891 A1* | 3/2008 | Koops | D01D 5/06 210/483 |
| 2010/0038306 A1* | 2/2010 | Livingston | B01D 61/027 210/496 |

OTHER PUBLICATIONS

The rehology of Torlon solutions.pdf—"The rehology of Torlon solutions and its role in the formation of ultra-thin defect-free Torlon hollow fiber membranes for gas separation"—Peng, Na et al—Journal of Membrane Science (Year: 2008).*
Akbari et al., "Application of nanofiltration hollow fibre membranes, developed by photografting, to treatment of anionic dye solutions," *Journal of Membrane Science* 297:243-252, 2007.
Ba et al., "Preparation and characterization of a neutrally charged antifouling nanofiltration membrane by coating a layer of sulfonated poly(ether ether ketone) on a positively charged nanofiltration membrane," *Journal of Membrane Science* 362:192-201, 2010.
Báquet et al., "From ultrafiltration to nanofiltration hollow fiber membranes: a continuous UV-photografting process," *Desalination* 144:9-14, 2002.
Cadotte et al., "Nanofiltration Membranes Broaden the Use of Membrane Separation Technology," *Desalination* 70:77-88, 1988.
He et al., "Preparation of composite hollow fiber membranes: co-extrusion of hydrophilic coating onto porous hydrophobic support structures," *Journal of Membrane Science* 207:143-156, 2002.
He et al., "Preparation and characterization of nanofiltration membranes by coating polyethersulfone hollow fibers with sulfonated poly(ether ether ketone) (SPEEK)," *Journal of Membrane Science* 307:62-72, 2008.
Hong et al., "Separation of Fluoride from Other Monovalent Anions Using Multilayer Polyelectrolyte Nanofiltration Membranes," *Langmuir* 23(4):1716-1722, 2007.
Hong et al., "Recovery of phosphate using multilayer polyelectrolyte nanofiltration membranes," *Journal of Membrane Science* 327:2-5, 2009.

Jian et al., "Preparation of UF and NF poly (phthalazine ether sulfone ketone) membranes for high temperature application," *Journal of Membrane Science* 161:185-191, 1999.
Jin et al., "Use of Polyelectrolyte Layer-by-Layer Assemblies as Nanofiltration and Reverse Osmosis Membranes," *Langmuir* 19(7):2550-2553, 2003.
Kim et al., "Preparation and Characterization of integrally skinned uncharged polyetherimide asymmetric nanofiltration membrane," *Journal of Membrane Science* 183:235-247, 2001.
Kosaraju et al., "Interfacially polymerized thin film composite membranes on microporous polypropylene supports for solvent-resistant nanofiltration," *Journal of Membrane Science* 321:155-161, 2008.
Krasemann et al., "Selective Ion Transport across Self-Assembled Alternating Multilayers of Cationic and Anionic Polyelectrolytes," *Langmuir* 16(2):287-290, 2000.
Lee et al., "Polyamide thin-film nanofiltration membranes containing $TiO_2$ nanoparticles," *Desalination* 219:48-56, 2008.
Li et al., "Nanofiltration—an attractive alternative to RO," *Water Technology* 32(4):32-35, 2009.
Liu et al., "An improved process to prepare high separation performance PA/PVDF hollow fiber composite nanofiltration membranes," *Separation and Purification Technology* 58(1):53-60, 2007.
Liu et al., "Study on the thin-film composite nanofiltration membrane for the removal of sulfate from concentrated salt aqueous: Preparation and performance," *Journal of Membrane Science* 310:289-295, 2008.
Lv et al., "Investigation of amphoteric polybenzimidazole (PBI) nanofiltration hollow fiber membrane for both cation and anions removal," *Journal of Membrane Science* 310:557-566, 2008.
Mansourpanah et al., "Formation of appropriate sites on nanofiltration membrane surface for binding $TiO_2$ photo-catalyst: Performance, characterization and fouling-resistant capability," *Journal of Membrane Science* 330:297-306, 2009.
Miao et al., A novel kind of amphoteric composite nanofiltration membrane prepared from sulfated chitosan (SCS), *Desalination* 181(1):173-183, 2005.
Nyström et al., "Fouling and retention of nanofiltration membranes," *Journal of Membrane Science* 98:249-262, 1995.
Ouyang et al., "Multilayer polyelectrolyte films as nanofiltration membranes for separating monovalent and divalent cations," *Journal of Membrane Science* 310:76-84, 2008.
Petersen., "Composite reverse osmosis and nanofiltration membranes," *Journal of Membrane Science* 83:81-150, 1993.
Schaep et al., "Influence of ion size and charge in nanofiltration," *Separation and Purification Technology* 14(1): 155-162, 1998.
Seman et al., "Reduction of nanofiltration membrane fouling by UV-initiated graft polymerization technique," *Journal of Membrane Science* 355:133-141, 2010.
Seman et al., "Development of antifouling properties and performance of nanofiltration membranes modified by interfacial polymerisation," *Desalination* 273:36-47, 2011.
Setiawan et al., "Fabrication of novel poly(amide-imide) forward osmosis hollow fiber membranes with a positively charged nanofiltration-like selective layer," *Journal of Membrane Science* 369:196-205, 2011.
Setiawan et al., "Explorations of delamination and irregular structure in poly(amide-imide)-polyethersulfone dual layer hollow fiber membranes," *Journal of Membrane Science* 423-424:73-84, 2012.
Setiawan et al., "Fabrication of poly(amide-imide)-polyethersulfone dual layer hollow fiber membranes applied in forward osmosis by combined polyelectrolyte cross-linking and depositions," *Desalination* 312:99-106, 2013.
Shan et al., "Polyelectrolyte multilayer films as backflushable nanofiltration membranes with tunable hydrophilicity and surface charge," *Journal of Membrane Science* 349:268-278, 2010.
Stanton et al., "Ultrathin, Multilayered Polyelectrolyte Films as Nanofiltration Membranes," *Langmuir* 19(17):7038-7042, 2003.
Su et al., "Cellulose acetate nanofiltration hollow fiber membranes for forward osmosis processes," *Journal of Membrane Science* 355:36-44, 2010.

(56) References Cited

OTHER PUBLICATIONS

Sullivan et al., "Ultrathin, Ion-Selective Polyimide Membranes Prepared from Layered Polyelectrolytes," *Journal of the American Chemical Society* 123(47):11805-11806, 2001.

Sun et al., "Polyamide-imide Nanofiltration Hollow Fiber Membranes with Elongation-Induced Nano-Pore Evolution," *AIChE Journal* 56(6):1481-1494, 2010.

Tan, "Development of nanofiltration dual-layer hollow fiber membranes for forward osmosis," Student Project, 2012, retrieved from http://www.repository.ntu.edu.sg/handle/10356/49444, Abstract only. (3 pages).

Tang et al., "Study on a novel polyester composite nanofiltration membrane by interfacial polymerization of triethanolamine (TEOA) and trimesoyl chloride (TMC) I. Preparation, characterization and nanofiltration properties test of membrane," *Journal of Membrane Science* 320:198-205, 2008.

Veríssimo et al., "New composite hollow fiber membrane for nanofiltration," *Desalination* 184(1):1-11, 2005.

Wang et al., "Polybenzimidazole Nanofiltration Hollow Fiber for Cephalexin Separation," *AIChE Journal* 52(4):1363-1377, 2006.

Wilhelm et al., "Cation permeable membranes from blends of sulfonated poly(ether ether ketone) and poly(ether sulfone)," *Journal of Membrane Science* 199:167-176, 2002.

Yang et al., "Poly(phthalazinone ether sulfone ketone) (PPESK) hollow fiber asymmetric nanofiltration membranes: Preparation, morphologies and properties," *Journal of Membrane Science* 270:1-12, 2006.

Yang et al., "Preparation and characterization of polypiperazine amide/PPESK hollow fiber composite nanofiltration membrane," *Journal of Membrane Science* 301:85-92, 2007.

Yoon et al., "High flux nanofiltration membranes based on interfacially polymerized polyamide barrier layer on polyacrylonitrile nanofibrous scaffolds," *Journal of Membrane Science* 326:484-492, 2009.

\* cited by examiner (A)

(B)

(C)

NANOFILTRATION MEMBRANE AND METHOD OF MANUFACTURING A NANOFILTRATION MEMBRANE

CROSS-REFERENCE TO RELATED APPLICATION

This application claims the benefit of priority of U.S. provisional application No. 61/810,409 filed on 10 Apr. 2013, the content of which is incorporated herein by reference in its entirety for all purposes.

TECHNICAL FIELD

The invention refers to a filtration membrane, in particular a nanofiltration membrane.

BACKGROUND

Nanofiltration (NF) is classified in the category between ultrafiltration (UF) and reverse osmosis (RO), and refers generally to a filtration technology involving use of a pressure driven membrane with pore size in the range of about 0.5 nm to 5 nm in diameter.

In the water treatment area, NF is generally used if high salt rejection of RO is not necessary. NF membranes may be used in diverse fields, such as water industry for water softening, color removal, heavy metal recovery, food industry, as well as pharmaceutical and biomedical industries. This has resulted in a rapid increase in global market for NF membranes from $89 million in 2006 to an estimated value of $310 million in 2012.

In general, a NF membrane consists of a selective skin layer supported by a porous substrate which provides necessary mechanical strength. The selective skin layer may be fabricated by integrally connecting it to the support layer. Such examples include integral asymmetric polybenzimidazole (PBI) and cellulose acetate NF hollow fiber membranes. This method requires a delicate polymer dope formula and a precise control of spinning conditions to avoid defect formation.

Interfacial polymerization may be used to prepare composite RO or NF membranes by covering the support layer with a polyamide thin film. Interfacial polymerization of polyamide as the selective layer may be carried out on various polymeric substrates, such as polysulfone (PSF), polyacrylonitrile (PAN), polyvinylidene fluoride (PVDF), and polypropylene.

Specific formula and optimum conditions are needed in order to form a homogeneous covalent bond between the carboxyl group from acyl halides (organic monomer) and the amine group from amine solutions (aqueous monomer). The amide groups are very sensitive to water molecules, as they can weaken the adhesion to the membrane support layer. Moreover, polyamide can be easily attacked by chlorine in water and/or waste water treatment which causes degradation of amide group.

In view of the above, there remains a need for improved nanofiltration membranes and methods to manufacture the nanofiltration membranes that address or at least alleviate one or more of the above-mentioned problems.

SUMMARY

In a first aspect, the invention refers to a nanofiltration membrane comprising a selective layer comprising or consisting of poly(amide-imide) cross-linked with polyallylamine.

In a second aspect, the invention refers to a method of manufacturing a nanofiltration membrane. The method includes:

a) providing a layer comprising or consisting of poly (amide-imide), and b) cross-linking the layer comprising or consisting of poly(amide-imide) with polyallylamine to form a selective layer comprising or consisting of poly(amide-imide) cross-linked with polyallylamine.

In a third aspect, the invention refers to use of a nanofiltration membrane according to the first aspect or a nanofiltration membrane prepared by a method according to the second aspect in a water softening process that is carried out at a low pressure of less than about 2 bar.

BRIEF DESCRIPTION OF THE DRAWINGS

The invention will be better understood with reference to the detailed description when considered in conjunction with the non-limiting examples and the accompanying drawings, in which.

DETAILED DESCRIPTION

Figure 1:
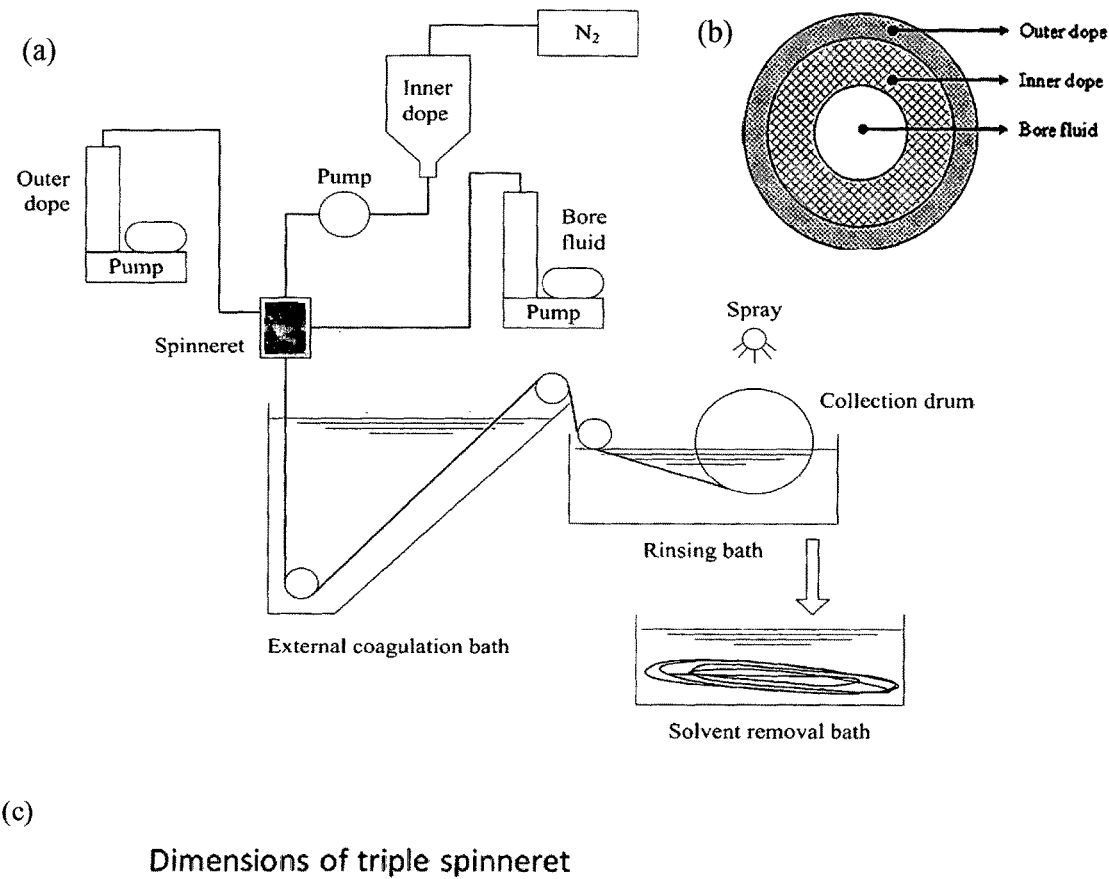
FIG. 1A is a schematic diagram of dual layer spinning.
FIG. 1B is a cross-sectional view of dual layer spinneret showing flow channels of outer and inner dopes, and bore fluid.
FIG. 1C is a cross-sectional view of dual layer spinneret showing dimensions of the various sections.

In a first aspect, the present invention refers to a nanofiltration membrane comprising a selective layer comprising or consisting of poly(amide-imide) cross-linked with polyallylamine.

Advantageously, by cross-linking poly(amide-imide) with polyallylamine, a selective layer that provides for high rejection to divalent cations and low rejection to monovalent cations is obtained. The rejection to divalent cations may be as high as 96% in the range from 88% to 96%, while the rejection to monovalent cations may be as low as −11% in the range from −11% to 12%. The negative rejection values of monovalent cations arise due to higher concentration of the monovalent cations in the permeate water as compared to the feed solution.

The difference in rejection level of the nanofiltration membrane to cations, depending on the charge present on the cations, means that the nanofiltration membrane is able to achieve high selectivity of divalent cations over monovalent cations. As a result, high flux under low operating pressure for the composite membrane may be obtained. This attribute renders the nanofiltration membrane suitable for use in applications, such as water softening processes that are carried out at low pressures of less than about 2 bar. In addition, the cross-linked poly(amide-imide) layer possesses high chlorine tolerance for long-term operation.

The term "nanofiltration" as used herein refers to processes that separate solutions of differing solute concentrations by reverse osmosis on membranes which are finer than those used in reverse osmosis. Typically, nanofiltration membranes have pore sizes less than 50 nm, which are between the pore sizes used in reverse osmosis and that in microfiltration and ultrafiltration.

Osmosis is defined as the net movement of water across a selectively permeable membrane driven by a difference in osmotic pressure across the membrane. A selectively permeable membrane allows passage of water ($H_2O$), but rejects solute molecules or ions. Osmotic pressure ($\pi$) is the pressure which, if applied to the more concentrated solution, prevents transport of water across the membrane.

In a reverse osmosis (RO) process, a predetermined pressure is applied to incoming water (feed solution) to force the incoming water through a semipermeable membrane. The applied pressure acts as the driving force for mass transport through the membrane.

The semipermeable membrane filters impurities from the incoming water (feed solution), leaving purified water, otherwise termed permeate water, on the other side (permeate side) of the membrane. The impurities left on the membrane are washed away by a portion of the incoming water that does not pass through the membrane. The feed solution carrying the impurities which are washed away from the membrane is also called "reject" or "brine".

Nanofiltration may be used to remove ions that contribute significantly to osmotic pressure, thereby allowing separation at pressures lower than those needed for reverse osmosis. For example, nanofiltration typically operates at a pressure in the range of approximately 65 psi to 465 psi, which is a lower pressure compared to the 800 psi to 1000 psi used in reverse osmosis.

Generally, the membranes used for nanofiltration are semipermeable polymer-based materials. The nanofiltration membranes may have a dense selective layer for rejecting dissolved compounds, and which is formed and/or attached onto a support layer that provides mechanical strength to the nanofiltration membrane.

As disclosed herein, the selective layer comprises or consists of poly(amide-imide) cross-linked with polyallylamine.

Poly(amide-imide) refers generally to a class of amorphous, high-performance polymers, having linear structured, mainly aromatic molecules. The poly(amide-imide) may be prepared from reactants comprising trimellitic acid compound and one or more wholly or partially aromatic primary diamines or fully or partially acylated diamines.

For example, trimellitic anhydride or an acyl halide derivative thereof such as 4-trimellitoyl anhydride chloride may be used. Examples of aromatic diamines include para- and meta-phenylenediamine, oxybis(aniline), thiobis(aniline), sulfonylbis(aniline), diaminobenzophenone, methylenebis(aniline), benzidine, 1,5-diaminonaphthalene, oxybis-(2-methylaniline) and thiobis(2-methylaniline).

The poly(amide-imide) may also be prepared from condensation polymerization using aromatic dicarboxylic acid and aromatic diisocyanate, or by condensation polymerization using aromatic dianhydride and aromatic diisocyanate.

Generally, the polymerization reaction is carried out in the presence of a nitrogen-containing, organic polar solvent, such as N-methylpyrrolidone, N,N-dimethylacetamide or N,N-dimethylformamide.

Advantageously, poly(amide-imide) has excellent mechanical properties and high thermal and chemical stability. In addition, poly(amide-imide) has unique imide groups which are able to undergo a cross-link reaction with amine-functionalized polyelectrolyte. As disclosed herein, this allows cross-linking reaction with polyallylamine to take place to form the selective layer.

In various embodiments, the poly(amide-imide) has general formula (I)

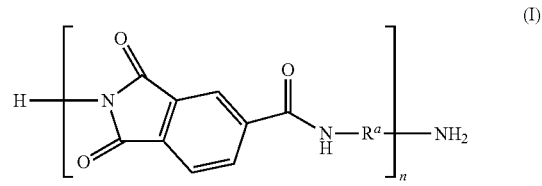

wherein $R^a$ at each occurrence is independently selected from the group consisting of optionally substituted $C_1$-$C_{20}$ alkyl, optionally substituted $C_2$-$C_{20}$ alkenyl, optionally substituted $C_2$-$C_{20}$ alkynyl, optionally substituted monocyclic, condensed polycyclic or bridged polycyclic $C_5$-$C_{20}$ aryl, optionally substituted $C_3$-$C_{20}$ mono-, or poly-cycloalkyl, optionally substituted $C_3$-$C_{20}$ mono-, or poly-cycloalkenyl; optionally substituted 2-20-membered heteroalkyl, optionally substituted 2-20-membered heteroalkenyl, optionally substituted 2-20-membered heteroalkynyl, optionally substituted 5-20-membered monocyclic, condensed polycyclic or bridged polycyclic heteroaryl, optionally substituted 3-20-membered mono-, or poly-heterocycloalkyl, and optionally substituted 3-20-membered mono-, or poly-heterocycloalkenyl; and n is an integer in the range from 20 to 1000.

In various embodiments, the poly(amide-imide) has repeating unit

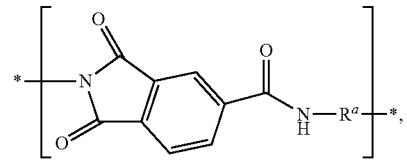

with definition of $R^a$ as mentioned above.

The term "optionally substituted" refers to a group in which none, one, or more than one of the hydrogen atoms has been replaced with one or more substituent group(s) such as, but not limited to, $C_{1-6}$ aliphatic group, hydroxy, alkoxy, cyano, halogen group such as F, Cl, Br, I, nitro, silyl, and amino, including mono- and di-substituted amino groups. As an example, an optionally substituted alkyl group means that the alkyl group may be substituted or unsubstituted. Exemplary substituents include $C_1$-$C_{10}$ alkoxy, $C_5$-$C_{10}$ aryl, $C_5$-$C_{10}$ aryloxy, sulfhydryl, $C_5$-$C_{10}$ arylthio, halogen, hydroxyl, amino, sulfonyl, nitro, cyano, and carboxyl.

The term "optionally substituted $C_1$-$C_{20}$ alkyl" refers to a fully saturated aliphatic hydrocarbon. The $C_1$-$C_{20}$ alkyl group may be straight chain or branched chain, and may be substituted or unsubstituted. Exemplary substituents have already been mentioned above. Whenever it appears here, a numerical range, such as 1 to 20 or $C_1$-$C_{20}$ refers to each integer in the given range, e.g. it means that an alkyl group comprises only 1 carbon atom, 2 carbon atoms, 3 carbon atoms etc. up to and including 20 carbon atoms. Examples of alkyl groups may be, but are not limited to, methyl, ethyl, n-propyl, isopropyl, n-butyl, isobutyl, s-butyl, t-butyl, n-hexyl, n-heptyl, n-octyl, n-nonyl or n-decyl and the like.

The term "optionally substituted $C_2$-$C_{20}$ alkenyl" refers to an aliphatic hydrocarbon having one or more carbon-carbon double bonds. The $C_2$-$C_{20}$ alkenyl group may be straight chain or branched chain, and may be substituted or unsubstituted. $C_2$-$C_{20}$ alkenyl groups include, without limitation, vinyl, allyl, 1-propenyl, 1-butenyl, 2-butenyl, 3-butenyl, 2-methyl-1-propenyl, and 2-methyl-2-propenyl.

The term "optionally substituted $C_2$-$C_{20}$ alkynyl" refers to an aliphatic hydrocarbon having one or more carbon-carbon triple bonds. The $C_2$-$C_{20}$ alkynyl group may be straight chain or branched chain, and may be substituted or unsubstituted. Examples of alkynyl groups may be, but are not limited to, ethynyl, 1-propynyl, 2-propynyl, 1-butynyl, 2-butynyl, and 3-butynyl, and the like.

The term "optionally substituted $C_5$-$C_{20}$ aryl group" refers to a group comprising an aromatic ring, wherein each of the atoms forming the ring is a carbon atom. Aromatic in this context means a group comprising a covalently closed planar ring having a delocalized $\pi$-electron system comprising $4w+2$ $\pi$-electrons, wherein w is an integer of at least 1, for example 1, 2, 3 or 4. Aryl rings may be formed by 5, 6, 7, 8, 9, 10, 11, 12, 13, 14, 15, 16, 17, 18, 19 or 20 carbon atoms. In various embodiments, such a group is a $C_5$-$C_{14}$ aryl, a $C_6$-$C_{12}$ aryl, a $C_6$ aryl, a $C_{10}$ aryl, a $C_{12}$ aryl, or a $C_{14}$ aryl.

The aryl group may be monocyclic, condensed polycyclic or bridged polycyclic. The term "monocyclic aryl" refers to a monocyclic aromatic carbon ring. Examples of monocyclic aryl groups may be, but are not limited to, phenyl and the like. The term "condensed polycyclic aryl" refers to an aromatic carbon ring structure in which more than 1 monocyclic carbon rings are condensed or fused. Examples include naphthyl, anthracenyl, and phenanthryl. The term "bridged polycyclic aryl" refers to an aromatic carbon ring structure in which 1 aromatic carbon ring is connected to another aromatic carbon ring via a bridging group or atom, such as an alkyl group, O, S, or N, or via a direct bond. Examples include biphenyl, triphenyl, phenyl-naphthyl, binaphthyl, diphenyl ether, diphenyl sulphide, diphenyl disulphide, and the like.

The aryl group is optionally substituted, i.e. the aryl group may be substituted or unsubstituted. As mentioned above, this means that the aryl group has none, one, or more than one hydrogen atom being replaced with one or more substituent group(s), such as, but are not limited to, a $C_{1-6}$ aliphatic group; a $C_3$-$C_{20}$ cycloalkyl or cycloalkenyl group; a $C_5$-$C_{10}$ aryl group; a diamide group, an ether group, a sulfone group or a ketone group.

The term "aliphatic", alone or in combination, refers to a straight chain or branched chain hydrocarbon comprising at least one carbon atom. Aliphatics include alkyls, alkenyls, and alkynyls. Aliphatics include, but are not limited to, methyl, ethyl, propyl, isopropyl, butyl, isobutyl, tert.-butyl, pentyl, hexyl, ethenyl, propenyl, butenyl, ethynyl, butynyl, propynyl, and the like, each of which may be optionally substituted.

In the context of various embodiments, by "$C_3$-$C_{20}$ cycloalkyl" is meant a group comprising a non-aromatic ring (i.e. an alicyclic ring) wherein each of the atoms forming the ring is a carbon atom. The $C_3$-$C_{20}$ cycloalkyl may be formed by three, four, five, six, seven, eight, nine, or more than nine carbon atoms including twenty carbon atoms. The $C_3$-$C_{20}$ cycloalkyl may be substituted or unsubstituted. The term "mono-cycloalkyl" refers to a mono-alicyclic ring. Examples of $C_3$-$C_{20}$ mono-cycloalkyl may include, but are not limited to, cyclopropane, cyclobutane, cyclopentane, cyclohexane, cycloheptane, and cyclooctane. The term "poly-cycloalkyl" refers to a carbon ring structure in which more than 1 mono-alicyclic carbon rings are fused or bridged. Examples include bicyclobutane, bicyclopentane, tricyclopentane, tricyclohexane, and tetracyclodecane.

By the term "$C_3$-$C_{20}$ cycloalkenyl", in the context of various embodiments, is meant a group comprising a non-aromatic ring (i.e. an alicyclic ring) wherein each of the atoms forming the ring is a carbon atom and contains one or more double bonds. The $C_3$-$C_{20}$ cycloalkenyl may be formed by three, four, five, six, seven, eight, nine, or more than nine carbon atoms including twenty carbon atoms. The $C_3$-$C_{20}$ cycloalkenyl may be substituted or unsubstituted. The term "mono-cycloalkenyl" refers to a mono-alicyclic ring which contains one or more double bonds. Examples of $C_3$-$C_{20}$ mono-cycloalkenyl include cyclopropene, cyclobutene, cyclopentene, cyclohexene, cycloheptene, cyclooctene, 1,3-cyclohexadiene, and 1,4-cyclohexadiene, among others. The term "poly-cycloalkenyl" refers to a carbon ring structure in which more than 1 mono-alicyclic carbon rings are fused or bridged, and the structure has one or more double bonds. Examples of $C_3$-$C_{20}$ poly-cycloalkenyl include bicyclobutene, bicyclopentene, tricyclopentene, tricyclohexene, and tetracyclodecene.

The term "heteroalkyl" refers to an alkyl wherein one or more carbon atoms are replaced by a heteroatom. The term "heteroalkenyl" refers to an alkenyl wherein one or more carbon atoms are replaced by a heteroatom. The term "heteroalkynyl" refers to an alkynyl wherein one or more carbon atoms are replaced by a heteroatom.

The term "heteroatom" refers to an atom other than carbon present in a main chain of a hydrocarbon. Heteroatoms are typically independently selected from oxygen, sulfur, nitrogen, and phosphorus.

The terms "1 to 20-membered" or "2 to 20-membered", refer to the number of straight chain or branched chain atoms including carbon and heteroatoms. In various embodiments, the number of straight chain or branched chain atoms for a 1-20-membered heteroalkyl is from 1-14, from 1-8, from 1-6, from 2-10, from 2-6, from 3-12, from 3-8, or from 4-10. In various embodiments, the number of straight chain or branched chain atoms for a 2-20-membered heteroalkenyl or a 2-20-membered heteroalkynyl is independently from 2-14, from 2-10, from 2-8, from 3-12, from 3-8, or from 4-10.

In the context of various embodiments, the terms "5-20-membered heteroaryl", has the general above definition of "$C_5$-$C_{20}$ aryl", except in that the heteroaryl is now termed as 5-20-membered, as 1 to 4 of the carbon atoms may be replaced by heteroatoms. Examples of heteroatoms have already been mentioned above. Examples of heteroaryl groups include, but are not limited to, furan, benzofuran, thiophene, benzothiophene, pyrrole, pyridine, indole, oxazole, benzoxazole, isoxazole, benzisoxazole, thiazole, benzothiazole, imidazole, benzimidazole, pyrazole, indazole, tetrazole, quinoline, isoquinoline, pyridazine, purine, pyrazine, furazan, triazole, benzotriazole, pteridine, phenoxazole, oxadiazole, benzopyrazole, quinolizine, cinnoline, phthalazine, quinazoline or quinoxaline, and the like.

The terms "3-20-membered heterocycloalkyl" and "3-20-membered heterocycloalkenyl" have the general above definitions of "$C_3$-$C_{20}$ cycloalkyl" and "$C_3$-$C_{20}$ cycloalkenyl" respectively, except in the alicyclic ring at least one of the carbon atom in the ring is substituted with a heteroatom. The $C_3$-$C_{20}$ heterocycloalkyl or $C_3$-$C_{20}$ heterocycloalkenyl may be formed by three, four, five, six, seven, eight, nine, or more than nine atoms including twenty atoms. The $C_3$-$C_{20}$ heterocycloalkyls and $C_3$-$C_{20}$ heterocycloalkenyls may be substituted or unsubstituted. Examples of $C_3$-$C_{20}$ heterocycloalkyls and $C_3$-$C_{20}$ heterocycloalkenyls include, but are not limited to, lactams, lactones, cyclic imides, cyclic thioimides, cyclic carbamates, tetrahydrothiopyran, 4H-pyran, tetrahydropyran, piperidine, 1,3-dioxin, 1,3-dioxane, 1,4-dioxin, 1,4-dioxane, piperazine, 1,3-oxathiane, 1,4-oxathiane, tetrahydro-1,4-thiazine, 2H-1,2-oxazine, maleimide, succinimide, barbituric acid, thiobarbituric acid, dioxopiperazine, hydantoin, dihydrouracil, morpholine, trioxane, hexahydro-1,3,5-triazine, tetrahydrothiophene, tetrahydrofuran, pyrroline, pyrrolidine, pyrrolidone, pyrrolidione, pyrazoline, pyrazolidine, imidazoline, imidazolidine, 1,3-dioxole, 1,3-dioxolane, 1,3-dithiole, 1,3-dithiolane, isoxazoline, isoxazohdme, oxazoline, oxazolidine, oxazolidinone, thiazoline, thiazolidine, and 1,3-oxathiolane.

The term "halogen" or "halo" as used herein refers to fluorine, chlorine, bromine or iodine.

n is an integer in the range from 20 to 1000. For example, n may be an integer in the range from 20 to 50, 20 to 250, 20 to 500, 20 to 750, 100 to 1000, 100 to 650, 100 to 400, 350 to 1000, 350 to 650, 300 to 850, 500 to 1000, 500 to 750, 750 to 1000, 250 to 750, 350 to 650, or 200 to 800.

For example, the poly(amide-imide) may comprise or consist of a polymer formed from monomers of

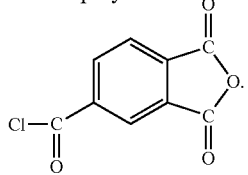

and H$_2$N—R$^a$—NH$_2$. Examples of R$^a$ have already been described above.

In various embodiments, R$^a$ at each occurrence is independently selected from the group consisting of optionally substituted monocyclic, condensed polycyclic or bridged polycyclic $C_5$-$C_{20}$ aryl, and optionally substituted 5-20-membered monocyclic, condensed polycyclic or bridged polycyclic heteroaryl.

In specific embodiments, R$^a$ at each occurrence is independently selected from the group consisting of

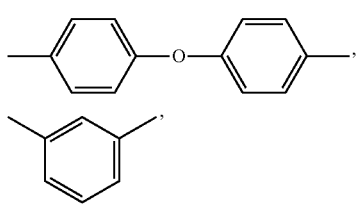

and isomers thereof.

For example, isomers of

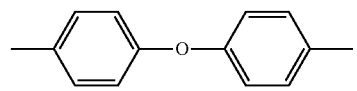

may include

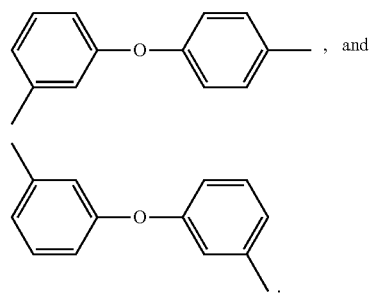

As another example, isomers of

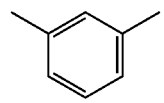

may include

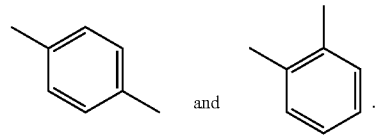

Ratio of monomers with

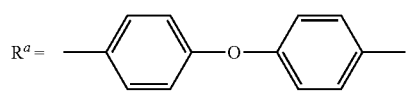

and isomers thereof to monomers with

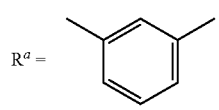

and isomers thereof may be about 7:3.

In specific embodiments, the poly(amide-imide) has general formula (II)

$$\text{H-}[(A)_p\text{-}(B)_q\text{-}(A)_s\text{-}(B)_t]_m\text{—NH}_2 \quad \text{(II)}$$

wherein A is

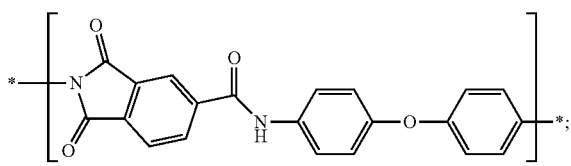

B is

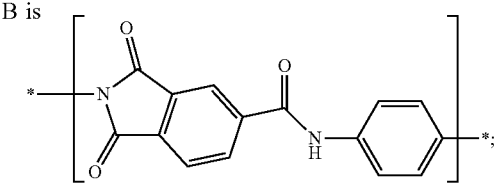

each of p, q, s, and t is independently 0, or an integer in the range of about 1 to about 10, with the proviso that at least one of p and s, and at least one of q and m is not 0; and m is an integer in the range of about 20 to 1000.

m is an integer in the range of about 20 to 1000. For example, m may be an integer in the range from 20 to 50, 20 to 250, 20 to 500, 20 to 750, 100 to 1000, 100 to 650, 100 to 400, 350 to 1000, 350 to 650, 300 to 850, 500 to 1000, 500 to 750, 750 to 1000, 250 to 750, 350 to 650, or 200 to 800.

In various embodiments, the poly(amide-imide) has repeating unit $[(A)_p\text{-}(B)_q\text{-}(A)_s\text{-}(B)_t]$, where the same definitions of A, B, p, q, s, and t as mentioned above apply.

The term "polyallylamine" as used herein refers to a polymer of allylamine. The polyallylamine may be formed from polymerization reaction comprising aliphatic ethylenically unsaturated alkylamine monomers having general formula (III)

$$R^b\text{—C}=\text{C—}R^c\text{—NH}_2 \quad \text{(III)}$$

wherein $R^b$ is optionally substituted $C_1$-$C_{10}$ alkyl and $R^c$ is $(CH_2)_r$, wherein r is an integer in the range of 1 to 10. For example, r may be 1, 2, 3, 4, 5, 6, 7, 8, 9, or 10.

Molecular weight of the polyallylamine may be in the range of about 8000 Da to about 25000 Da. For example, molecular weight of the polyallylamine may be in the range of about 10000 Da to about 25000 Da, about 15000 Da to about 25000 Da, about 20000 Da to about 25000 Da, about 8000 Da to about 20000 Da, about 8000 Da to about 15000 Da, about 8000 Da to about 10000 Da, about 12000 Da to about 18000 Da, or about 10000 Da to about 20000 Da. In specific embodiments, molecular weight of the polyallylamine is about 15000 Da.

The polyallylamine may be a water-soluble polyamine having primary amino groups of a free base type, such as polyallylamine, poly(allylamine hydrochloride), diallyl amine, and copolymers of the afore-mentioned.

The poly(amide-imide) is cross-linked with polyallylamine to form the selective layer. The term "cross-linked" as used herein refers to formation of interconnecting bonds between the polymer chains. By cross-linking poly(amide-imide) with polyallylamine, a selective layer that provides for high rejection to divalent cations and low rejection to monovalent cations is obtained. This selectivity of divalent cations to monovalent cations translates into high flux under low operating pressure for the nanofiltration membrane, which renders the nanofiltration particularly suitable for applications that are carried out at low operating pressures.

The nanofiltration membrane may be a multi-layer hollow fiber membrane. For example, the multi-layer hollow fiber membrane may be a dual layer hollow fiber membrane. In various embodiments, the multi-layer hollow fiber membrane comprises an inner layer comprising or consisting of polyethersulfone, and an outer layer comprising the selective layer comprising or consisting of poly(amide-imide) cross-linked with polyallylamine.

As mentioned above, the nanofiltration membranes may have a dense selective layer for rejecting dissolved compounds, and a support layer to provide mechanical strength to the nanofiltration membrane. Accordingly, the inner layer comprising polyethersulfone may function as the support layer to provide mechanical strength to the nanofiltration membrane, and the outer layer comprising poly(amide-imide) cross-linked with polyallylamine may function as the selective layer for rejecting dissolved compounds.

Advantageously, hollow fiber membranes provide for improved packing density, higher surface area to volume ratio, self-support capability, and cost-effective large-scale production and operation.

Thickness of the selective layer may be in the range of about 20 μm to about 50 μm, such as about 20 μm to about 40 μm, about 20 μm to about 30 μm, about 25 μm to about 50 μm, about 30 μm to about 50 μm, about 40 μm to about 50 μm, or about 30 μm to about 40 am.

In various embodiments, the selective layer of poly (amide-imide) cross-linked with polyallylamine comprises units of general formula (IV)

(IV)

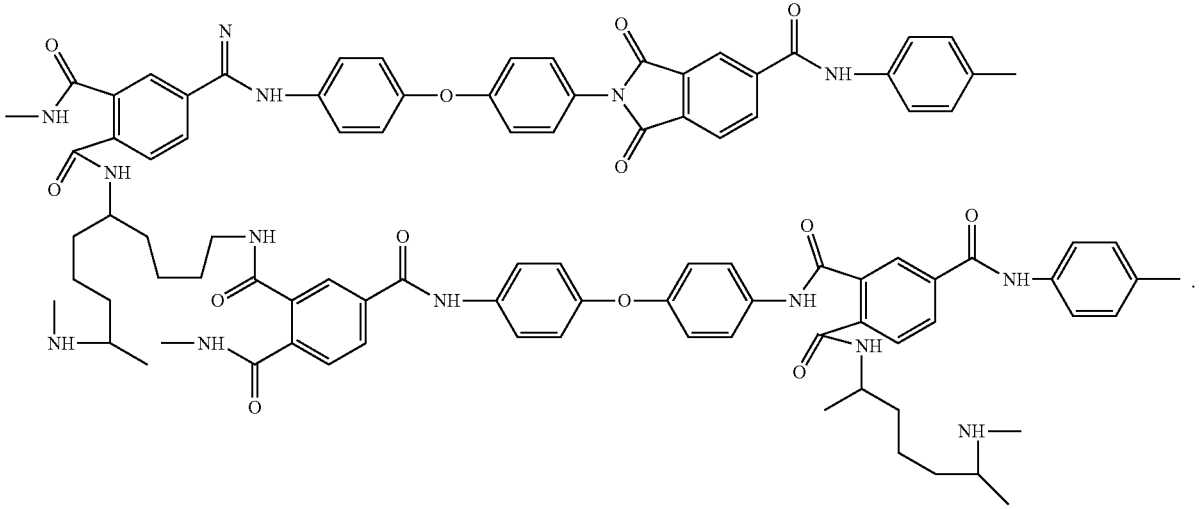

In a second aspect, the invention refers to a method of manufacturing a nanofiltration membrane. The method comprises providing a layer comprising or consisting of poly(amide-imide), and cross-linking the layer comprising or consisting of poly(amide-imide) with polyallylamine to form a selective layer comprising or consisting of poly(amide-imide) cross-linked with polyallylamine.

In various embodiments, the poly(amide-imide) has general formula (I)

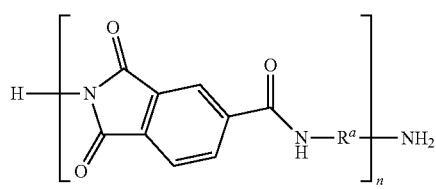
(I)

wherein $R^a$ at each occurrence is independently selected from the group consisting of optionally substituted $C_1$-$C_{20}$ alkyl, optionally substituted $C_2$-$C_{20}$ alkenyl, optionally substituted $C_2$-$C_{20}$ alkynyl, optionally substituted monocyclic, condensed polycyclic or bridged polycyclic $C_5$-$C_{20}$ aryl, optionally substituted $C_3$-$C_{20}$ mono-, or poly-cycloalkyl, optionally substituted $C_3$-$C_{20}$ mono-, or poly-cycloalkenyl; optionally substituted 2-20-membered heteroalkyl, optionally substituted 2-20-membered heteroalkenyl, optionally substituted 2-20-membered heteroalkynyl, optionally substituted 5-20-membered monocyclic, condensed polycyclic or bridged polycyclic heteroaryl, optionally substituted 3-20-membered mono-, or poly-heterocycloalkyl, and optionally substituted 3-20-membered mono-, or poly-heterocycloalkenyl; and n is an integer in the range from 20 to 1000.

The poly(amide-imide) may have repeating unit

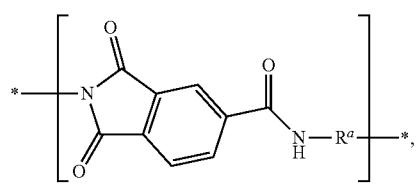

with definition of $R^a$ as mentioned above.

In various embodiments, $R^a$ at each occurrence is independently selected from the group consisting of optionally substituted monocyclic, condensed polycyclic or bridged polycyclic $C_5$-$C_{20}$ aryl, and optionally substituted 5-20-membered monocyclic, condensed polycyclic or bridged polycyclic heteroaryl.

In specific embodiments, $R^a$ at each occurrence is independently selected from the group consisting of

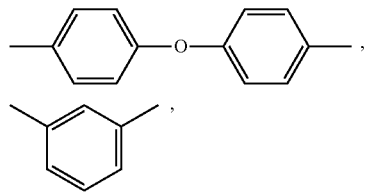

and isomers thereof.

For example, isomers of

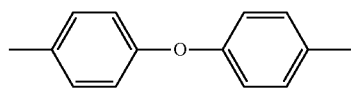

may include

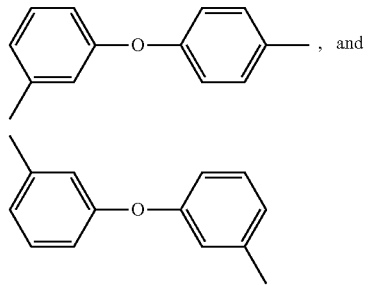

, and

As another example, isomers of

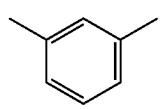

may include

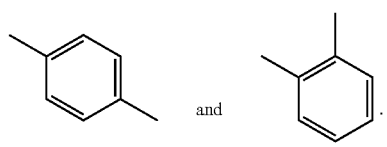

and

Ratio of monomers with $R^a=$ 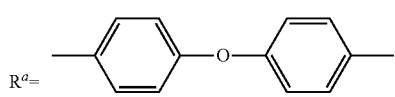

and isomers thereof to monomers with $R^a=$ 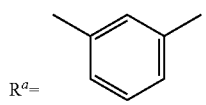

and isomers thereof may be about 7:3.

For example, the poly(amide-imide) may comprise or consist of a polymer formed from monomers of

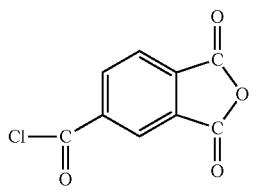 [SMILES: O=C(Cl)c1ccc2c(c1)C(=O)OC2=O]

and $H_2N\text{---}R^a\text{---}NH_2$. Examples of $R^a$ have already been described above.

In specific embodiments, the poly(amide-imide) has general formula (II)

$$H\text{-}[(A)_p\text{-}(B)_q\text{-}(A)_s\text{-}(B)_t]_m\text{---}NH_2 \quad \text{(II)}$$

wherein A is

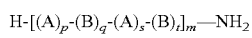

B is

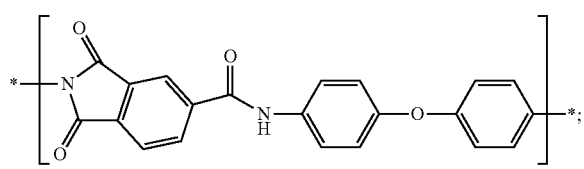

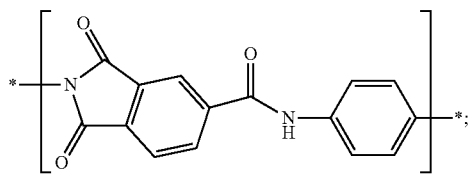

each of p, q, s, and t is independently 0, or an integer in the range of about 1 to about 10, with the proviso that at least one of p and s, and at least one of q and m is not 0; and m is an integer in the range of about 20 to 1000.

The polyallylamine may be formed from polymerization reaction comprising aliphatic ethylenically unsaturated alkylamine monomers having general formula (III)

$$R^b\text{---}C\text{=}C\text{---}R^c\text{---}NH_2 \quad \text{(III)}$$

wherein $R^b$ is optionally substituted $C_1\text{-}C_{10}$ alkyl and $R^c$ is $(CH_2)_r$, wherein r is an integer in the range of 1 to 10.

The polyallylamine may be a water-soluble polyamine having primary amino groups of a free base type, such as polyallylamine, poly(allylamine hydrochloride), diallyl amine, and copolymers of the afore-mentioned. As mentioned above, molecular weight of the polyallylamine may be in the range of about 8000 Da to about 25000 Da. In specific embodiments, molecular weight of the polyallylamine is about 15000 Da.

Selective layer of poly(amide-imide) cross-linked with polyallylamine may comprise units of general formula (IV)

(IV)

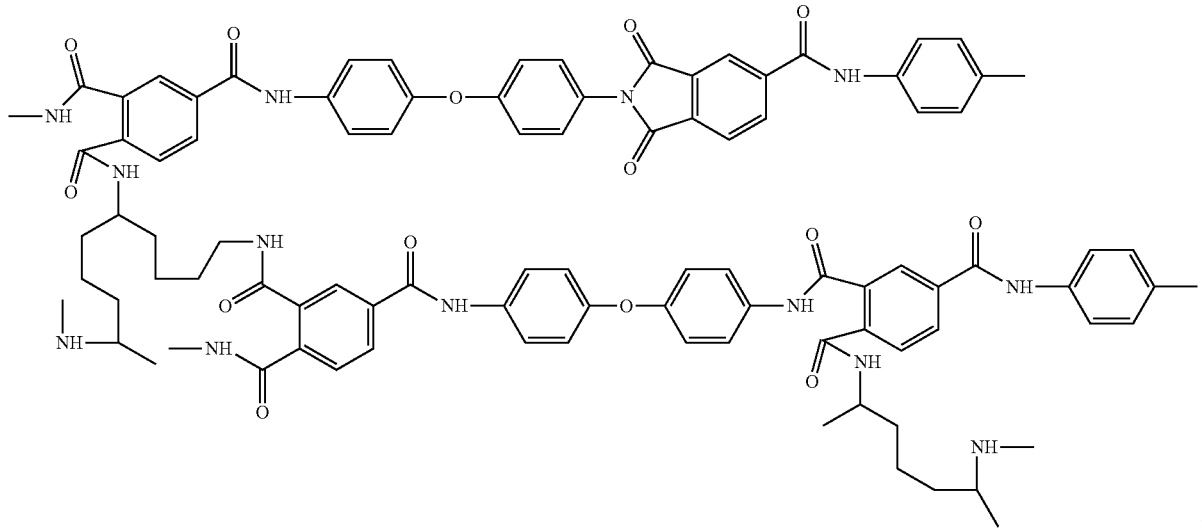

The nanofiltration membrane may be a multi-layer hollow fiber membrane. In various embodiments, the multi-layer hollow fiber membrane comprises an inner layer comprising or consisting of polyethersulfone, and an outer layer comprising the selective layer comprising or consisting of poly(amide-imide) cross-linked with polyallylamine.

The multi-layer hollow fiber membrane may be prepared by co-spinning with a triple orifice spinneret.

In various embodiments, preparing the multi-layer hollow fiber membrane by co-spinning with a triple orifice spinneret comprises extruding a bore liquid through an inner channel of the triple orifice spinneret; extruding an inner doping liquid through a middle channel of the triple orifice spinneret, the inner doping liquid comprising 10 to 17 wt % polyethersulfone, 10 to 15 wt % poly(ethylene glycol), 2 to 7 wt % lithium chloride, and 61 to 78 wt % n-methyl-2-pyrrolidone; and extruding an outer doping liquid through an outer channel of the triple orifice spinneret, the outer doping liquid comprising 15 to 20 wt % polyamide-imide, optionally 1 to 5 wt % poly(ethylene glycol), optionally 1 to 5 wt % lithium chloride, optionally 1 to 5 wt % water, and 65 to 85 wt % n-methyl-2-pyrrolidone. The wt % of components in the respective inner and outer doping liquids add up to 100%, and are calculated based on total weight of the respective inner and outer doping liquids. For example, for an inner doping liquid having 10 wt % polyethersulfone, 10 wt % poly(ethylene glycol), and 2 wt % lithium chloride, amount of n-methyl-2-pyrrolidone may be 78 wt %.

Co-spinning with a triple orifice spinneret may be carried out at any suitable temperature. Advantageously, the co-spinning may be carried out at a temperature in the range of about 20° C. to about 30° C., i.e. ambient temperature.

Cross-linking the poly(amide-imide) layer with polyallylamine to form a selective layer comprising or consisting of poly(amide-imide) cross-linked with polyallylamine may comprise immersing the poly(amide-imide) layer in an aqueous solution comprising polyallylamine at a temperature in the range of about 50° C. to about 80° C.

In various embodiments, the poly(amide-imide) layer is immersed in an aqueous solution comprising polyallylamine at a temperature in the range of about 60° C. to about 80° C., about 70° C. to about 80° C., about 50° C. to about 70° C., about 50° C. to about 60° C., about 60° C. to about 70° C., or about 55° C. to about 75° C.

Immersing the poly(amide-imide) layer in an aqueous solution comprising polyallylamine may be carried out for any suitable time period. For example, immersing the poly(amide-imide) layer in the aqueous solution comprising polyallylamine may be carried out for a time period in the range of about 10 minutes to about 60 minutes, such as about 10 minutes to about 50 minutes, about 10 minutes to about 40 minutes, about 10 minutes to about 30 minutes, about 10 minutes to about 20 minutes, about 20 minutes to about 60 minutes, about 30 minutes to about 60 minutes, about 40 minutes to about 60 minutes, about 50 minutes to about 60 minutes, about 25 minutes to about 55 minutes, or about 15 minutes to about 45 minutes.

Concentration of polyallylamine in the aqueous solution may be in the range of about 0.5 wt % to about 2 wt %, such as about 0.5 wt % to about 1.5 wt %, about 0.5 wt % to about 1 wt %, about 1 wt % to about 2 wt %, about 1.5 wt % to about 2 wt %, about 0.8 wt % to about 1.8 wt %, or about 1.2 wt % to about 1.6 wt %.

Advantageously, by carrying out a co-extrusion method utilizing a single step phase inversion process, followed thereafter by a simple cross-linking treatment to yield a positively charged nanofiltration-like skin layer, a simple and effective way to manufacture nanofiltration membranes that may be scaled up easily to industrial scale production is obtained.

In a third aspect, the invention refers to use of a nanofiltration membrane according to the first aspect or a nanofiltration membrane prepared by a method according to the second aspect in a water softening process that is carried out at a low pressure of less than about 2 bar.

As mentioned above, high selectivity of divalent cations over monovalent cations displayed by the nanofiltration membrane means that high flux under low operating pressure for the composite membrane may be obtained. This effect may be attributed to presence of a selective layer formed of poly(amide-imide) cross-linked with polyallylamine in the nanofiltration membrane. This attribute renders the nanofiltration membrane suitable for applications, such as water softening processes carried out at low operating pressures of less than 2 bar.

As demonstrated herein, using a feed solution containing a salt mixture (500 ppm magnesium chloride ($MgCl_2$), 900 ppm calcium chloride ($CaCl_2$), and 1600 ppm sodium chloride (NaCl)) with a total dissolved salt (TDS) content as high as 3000 ppm, salt water permeability of 16 $l/m^2 \cdot hr$ and 94% rejection to divalent cations has been obtained. When TDS in the feed solution reaches 5000 ppm (833 ppm $MgCl_2$, 1500 ppm $CaCl_2$ and 2667 ppm NaCl), the membrane has demonstrated its ability to perform well with 13.5 $l/m^2 \cdot hr \cdot bar$ salt water permeability and 87.7% and 81.8% rejections to $Mg^{2+}$ and $Ca^{2+}$, respectively, under 2 bar operating pressure.

Further, the selective layer comprising or consisting of poly(amide-imide) that is cross-linked with polyallylamine possesses high chlorine tolerance for long-term operation, as evidenced by tests that have been carried out for 6 week.

Hereinafter, the present invention will be described more fully with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, lengths and sizes of layers and regions may be exaggerated for clarity.

As used herein, the term "and/or" includes any and all combinations of one or more of the associated listed items. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The invention illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

EXPERIMENTAL SECTION

Example 1: Fabrication of Polyamide-Imide (PAI)-Polyethersulfone (PES) Dual Layer Ultrafiltration (UF) Hollow Fiber Membranes FIG. 1 shows a schematic diagram of dual-layer hollow fiber spinning line for hollow fiber substrate fabrication.

Basically, the inner dope solution, connected to a high pressure nitrogen gas cylinder, was extruded through the middle channel of the spinneret (see FIG. 1B) at a specific flow rate using a Zenith gear pump. The outer dope solution and the bore fluid were extruded using two high precision syringe pumps (Isco) through the outer and inner channels, respectively. Dimension of the triple spinneret used is shown in FIG. 1C.

The nascent fibers went through a predetermined air gap before immersing into an external coagulation bath at a controlled temperature, and then were collected by a roller at a free fall take-up speed. The resultant hollow fiber membranes were stored in a water bath for approximately 2 days at ambient temperature to ensure that the residual solvent has been removed completely. A post-treatment was performed to alleviate the membrane shrinkage and pores collapse during drying process at ambient condition. The membrane was immersed into a water/glycerol mixture for 24 h. This process allowed the glycerol to replace water gradually in the membrane pores. The membranes were subsequently dried at room temperature prior to the characterization tests and further application. The glycerol inside the membrane pores can act as the pore supporter to alleviate the collapse of pores during membrane drying process.

The dual-layer hollow fiber substrates were prepared using polyethersulfone (PES) polymer materials dissolved in n-methyl-2-pyrrolidone (NMP) as an inner layer dope. Concentration of PES may vary from 10 wt % to 17 wt %. 10 wt % to 15 wt % poly(ethylene glycol) (PEG) and 2 wt % to 7 wt % lithium chloride (LiCl) are adopted as non-solvent additives into the dope solution. The outer dope is made of 15 wt % to 20 wt % polyamide-imide (PAI) dissolved in NMP. 1 wt % to 5 wt % PEG and/or LiCl and/or water may also be added into the dope as additives. A mixture of NMP and water of certain weight ratios of between 0/100 and 80/20 is adopted as the bore fluid.

The temperature of the spinneret is controlled between 20° C. to 30° C. The air gap from 0.1 cm to 5 cm is used. The dual layer hollow fibre substrate has an outer diameter of from 1200 μm to 1500 μm, and an inner diameter from 800 μm to 1100 μm.

Table 1 below details the two polymer compositions and dry-jet wet spinning conditions used in embodiments.

TABLE 1

Dope compositions and spinning parameters for dual layer PAI-PES hollow fiber substrates.

| | |
|---|---|
| Outer Dope | 16 wt % PAI + 3 wt % LiCl + 3 wt % PEG(400) + 3 wt % $H_2O$ + 75 wt % NMP |
| Inner Dope | 15 wt % PES + 5 wt % LiCl + 10 wt % PEG(400) + 70 wt % NMP |
| Inner dope solution flow rate (g/min) | 6 |
| Outer dope solution flow rate (g/min) | 2 |
| Coagulant | water |
| Coagulant temperature (° C.) | 23 |
| Bore fluid composition | water |
| Bore fluid flow rate (ml/min) | 8 |
| Take up speed (m/min) | 5.68 |
| Air gap (cm) | 0.5 |
| Ambient temperature (° C.) | 23 |
| Room humidity (%) | 80 |

Example 2: Formation of Positively Charged NF Skin Layer by Cross-Linking with Polyallylamine When preparing dual-layer hollow fibers as the substrate, the pore sizes of as-spun dual-layer hollow fiber are controlled in the ultrafiltration (UF) range through choosing appropriate dope compositions and spinning conditions.

The positively charged dense NF-like selective layer may be fabricated on PAI UF single layer hollow fibers by a simple chemical post-treatment using a PEI aqueous solution. A similar approach was adopted, and as disclosed herein, treated PAI/PES dual-layer hollow fiber was endowed with separation ability to divalent cations.

Chemical post-treatment was conducted by immersing the hollow fiber substrate into a 500 ml of a PAAm aqueous solution at temperature of 50° C. to 80° C. The action time varied from 10 min to 60 min and the PAAm concentration varied from 0.5% to 2% (w/w). Next, the membranes were rinsed using purified water 3 times to wash off the unreacted amine group and stored for further characterization and usage.

Chemical cross-linking took place on the PAI outer layer only to yield a positively charged NF layer. In various embodiments, the optimized cross-linking procedure involves an aqueous solution containing 1 wt % PAAm with molecular weight of 15,000 Da. The reaction temperature is controlled at 70° C. for 40 min. The chemicals and cross-linking conditions used are summarized in Table 2.

TABLE 2

Chemicals and cross-linking conditions used for NF layer formation.

| Cross-linking Agent | Molecular Weight | Concentration | Cross-link Temperature | Time |
|---|---|---|---|---|
| Poly(ally amine) (PAAm) | 15,000 Da | 1 wt. % | 70° C. | 40 min |

Example 3: Characteristics of Composite NF Hollow Fiber Membranes

Figure 2:
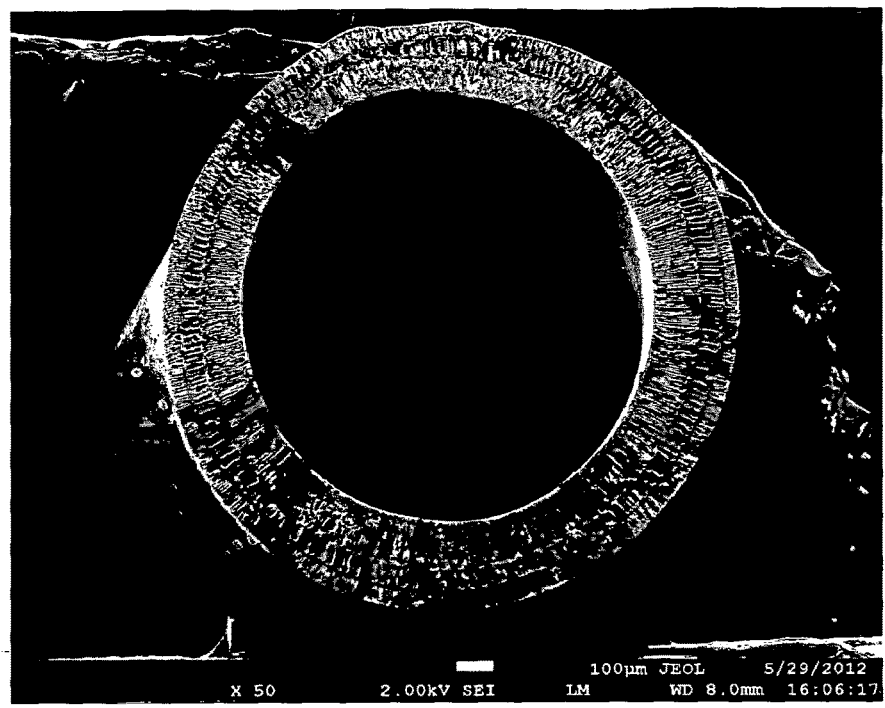
FIG. 2A to 2C are scanning electron microscope (SEM) images of cross-sectional morphologies of polyamide-imide-polyethersulfone (PAI-PES) dual-layer ultrafiltration (UF) substrate (A, B) before, and (C) after cross-linking. Scale bar in FIG. 2A denotes a length of 100 µm; scale bar in FIG. 2B and FIG. 2C denotes a length of 10 µm.
Figure 2:
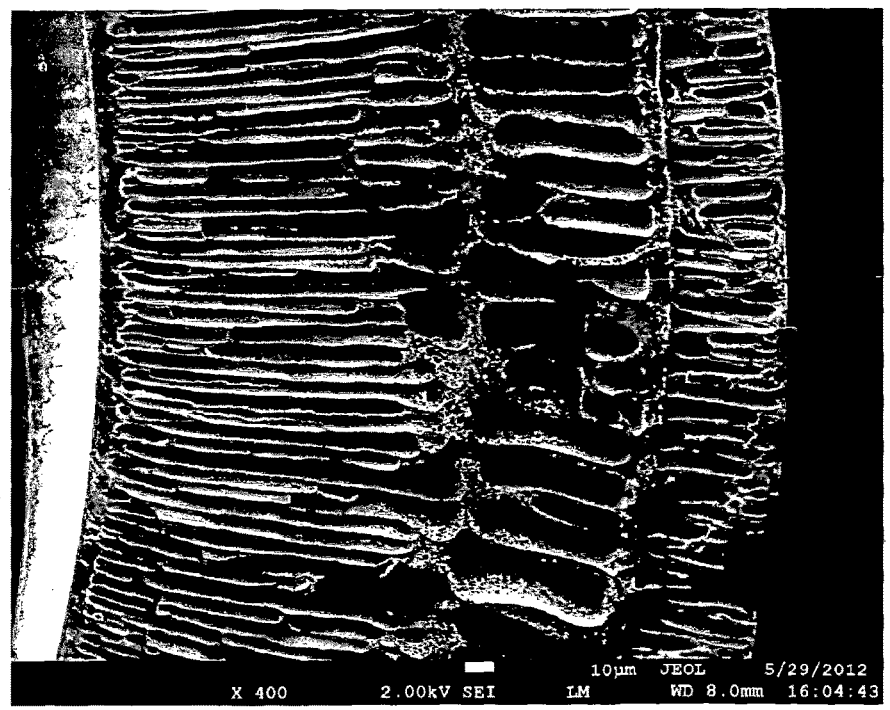
Figure 2:
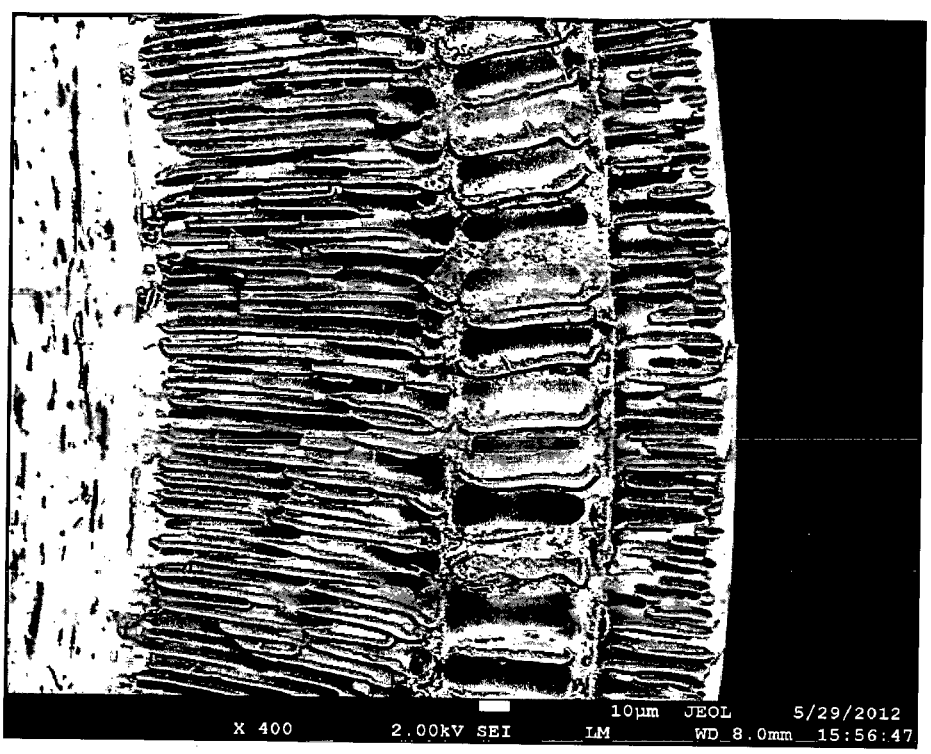
Figure 3:
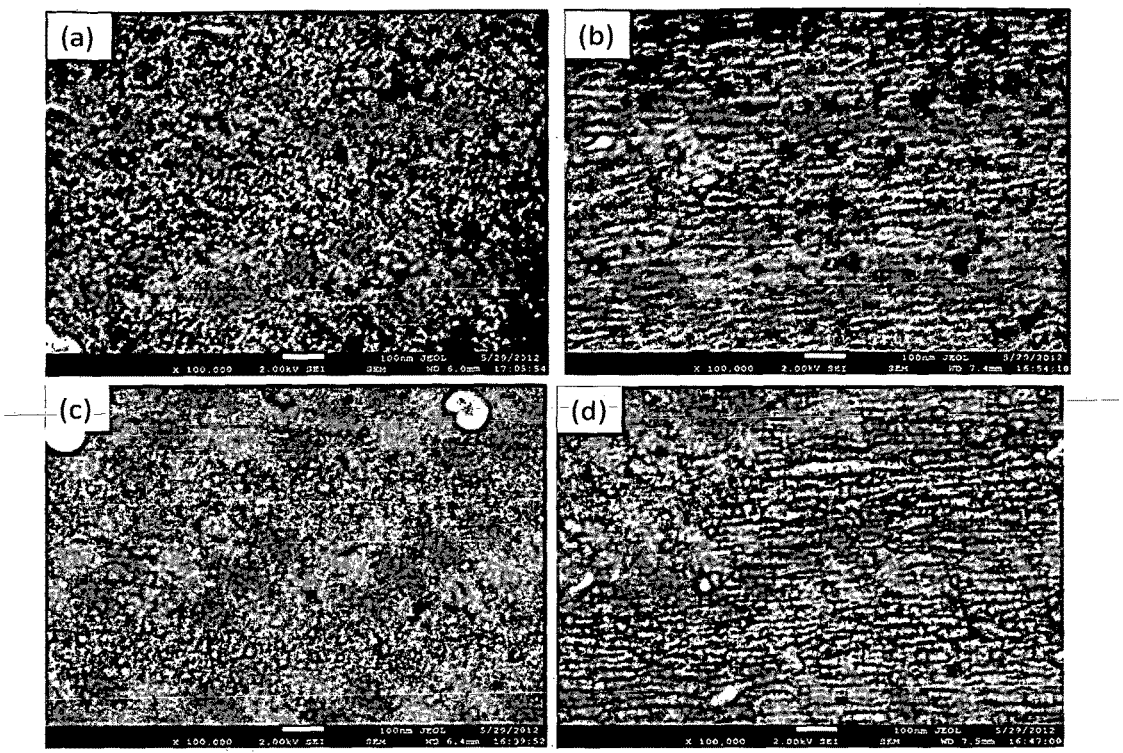
FIG. 3A to 3D are scanning electron microscope (SEM) images of outer/inner surface morphology of the dual layer hollow fibers at 100 K magnification, where the various images depict (A) outer PAI layer before cross-linking; (B) inner PES layer before cross-linking; (C) outer PAI layer after cross-linking; and (D) inner PES after cross-linking. Scale bar in FIG. 3A to 3D denotes a length of 100 nm.
Figure 4:
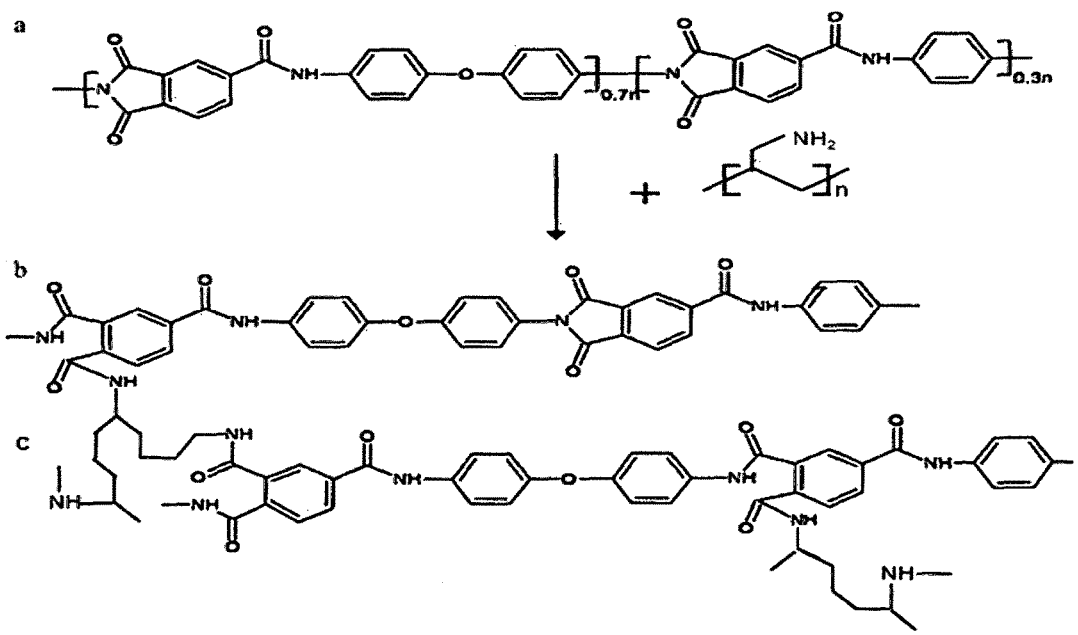
FIG. 4 is a schematic diagram showing possible mechanism of chemical cross-linking between PAI and polyacrylamide (PAAm).

The cross-sectional morphologies of the PAI-PES dual-layer UF substrate before and after cross-linking observed by ZeissEVO50 SEM are shown in FIG. 2. No obvious difference can be observed in the cross-section. However, when the outer surfaces of PAI layer before and after cross-linking shown in FIGS. 3A and 3C, respectively were compared, it can be seen that the chemical cross-linking made the PAI surface structure become tightened and smooth, while the inner surfaces of PES layers remain almost unchanged. The possible mechanism of chemical cross-linking is described in FIG. 4, which can be confirmed by FTIR measurement.

The membrane dimension, pure water permeability (PWP) and molecular weight cut-off (MWCO) of the virgin and modified membranes can be found from Table 3. The MWCO characterization method was utilized to measure the separation characteristics of membrane using an approximately 2000 ppm dextran aqueous solution. The dextran solution contained a broad molecular weight distribution from 6000 to 500,000 Dalton and was circulated through the shell side of the membrane module at 1 bar. The dextran molecular weight distribution in the feed and permeate solutions were measured by gel permeation chromatography (GPC) on a Polymer Laboratories-GPC 50 plus system (double PL aquagel-OH Mixed-M 8 μm columns). The concentrations of dextran molecule with particular molecular weight in the feed and permeate solutions can be represented by the GPC spectrum intensity. The MWCO of hollow fiber membranes is defined as the molecular weight at 90% rejection.

Before the post treatment, the original UF membrane has the PWP of 170 l/m²·h·bar and a MWCO of 21,000 Da, which suggests that it is a typical UF membrane. After the post-treatment of chemical cross-linking, the PWP decreased to 23 l/m²·h·bar while the MWCO drops to less than 6000 Da due to the surface pores being sealed as a result of cross-linking reaction between the PAI and PAAm.

TABLE 3

Membrane dimension and basic properties of PWP and MWCO.
Cross-linking conditions: PAAm (1 wt %), 40 min, 70° C.

| | | | Before Cross-linking | | After Cross-linking | |
|---|---|---|---|---|---|---|
| | OD μm | ID μm | PWP (L/m²·h·bar) | MWCO (Da) | PWP (L/m²·h·bar) | MWCO (Da) |
| PAI/PES dual layer hollow fiber | 1500 | 1100 | 170 | 21,000 | 23 | <6,000 |

The hydrophobic/hydrophilic properties of the hollow fibers were determined by dynamic contact angle measurements using a tensiometer (DCAT11 Dataphysics, Germany). The contact angles of PES and PAI single hollow fiber membrane were compared with that of PAI-PES dual layer hollow fiber membranes, and the results are listed in Table 4. It can be seen that the PAI-PES dual layer membrane possesses the same contact angle of PAI single layer membrane. It suggests that the outer layer of the dual-layer membrane is fully covered by the PAI material.

TABLE 4

Contact angels of three types of membranes.

| Membrane | Contact angle (°) | Standard deviation |
|---|---|---|
| PES single layer | 70.3 | 0.51 |
| PAI single layer | 61.5 | 1.80 |
| PAI-PES dual layer | 61.4 | 1.35 |

Table 5 also summarized the mechanical properties of the three types of hollow fibers including Young's modulus, tensile stress and tensile strain, measured using a Zwick 0.5 kN Universal Testing Machine. It can be seen that the mechanical strength of dual-layer hollow fibers depends essentially on the combined characteristics of the PAI and PES tow materials. The rigidity of the dual-layer hollow fibers was enhanced due to contribution of the PAI material, but the ductile property was weakened a bit compared to PAI membrane.

TABLE 5

Mechanical strength of three types of membranes.

| Membrane | Young's modulus $E_t$ (Mpa) | Tensile stress $\sigma_M$ (Mpa) | Tensile strain $\varepsilon_M$ (%) |
|---|---|---|---|
| PES single layer | 69.7 | 3.3 | 62.5 |
| PAI single layer | 128 | 6.1 | 34.4 |
| PAI-PES dual layer | 96 | 3.7 | 27.2 |

Chlorine is commonly utilized to kill bacteria in water. However, the selectivity of commercial polyamide thin film composite (TFC) membranes is rapidly and permanently lost once exposed to the feed water containing more than a few ppb levels of chlorine or hypochlorite disinfectants, which means that additional pre-treatment steps for chlorine removal must be taken before the feed water is exposed to polyamide TFC membranes. A good NF composite membrane has to tolerate about 20 ppm chlorine or hypochlorite. Thus static chlorine resistance test was carried out to investigate the chlorine tolerance of the newly developed cross-linked PAI-PES dual layer NF hollow fiber membrane.

A certain amount of fibers were soaked in the 1500 ppm sodium hypochlorite (NaOCl) solution at room temperature, and two fibers were taken out on every third day to prepare membrane module and test for salt water permeability and salt rejection. The soaking solution was replaced with freshly prepared 1500 ppm NaOCl solution every third day after taking sample fibers to keep a consistent active chlorine concentration. The test was carried out for 6 weeks as shown in FIG. 5.

Figure 5:
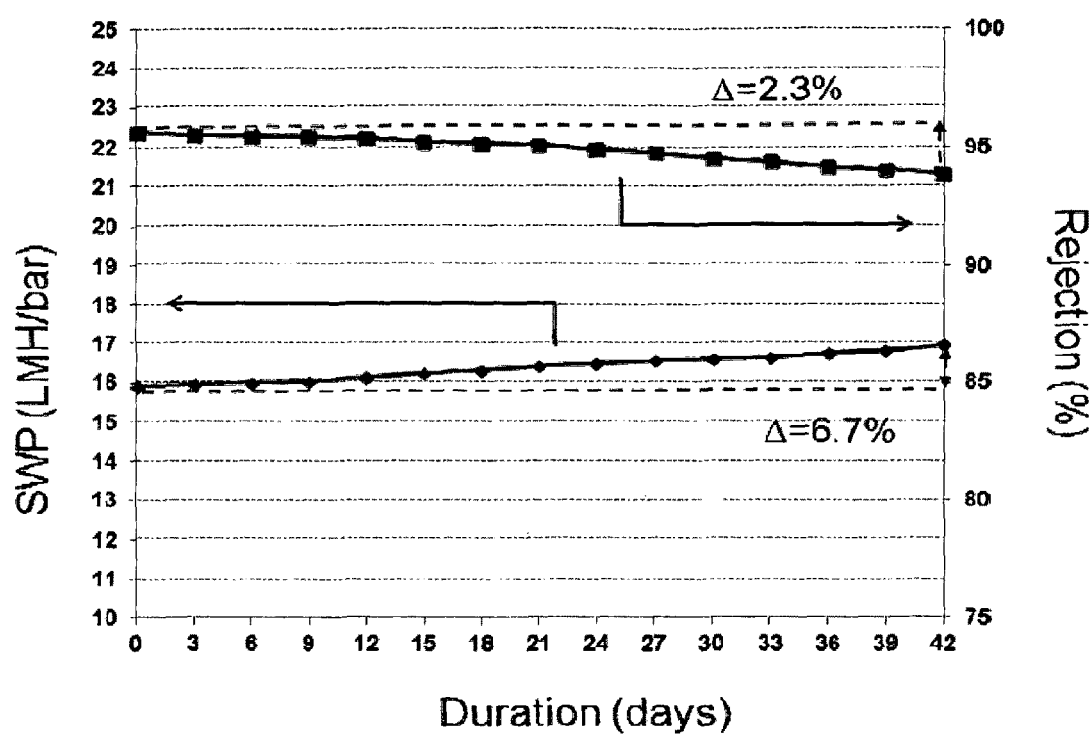
FIG. 5 is a graph showing results of static chlorine resistance test of cross-linking treated dual layer hollow fibers. Primary y-axis denote salt water permeability (SWP) (LMH/bar); secondary y-axis denote rejection (%); and x-axis denote duration (days).

It can be seen from FIG. 5 that no obvious change in the rejection and SWP data was found in the first 12 days, whereas the rejection gradually dropped and salt water flux increased accordingly afterward. At the end of 6 weeks test, the variation in the rejection and SWP data was 2.3% and 6.7%, respectively. The deterioration of performance compared to the virgin membrane was still below 10%, at which the membrane function is claimed as failure. The results indicated that the cross-linked PAI outer layer possessed greater chlorine tolerance for long-term operation.

Example 4: Separation Properties of Dual Layer NF Hollow Fiber Membranes for Water Softening The separation behavior of the developed dual layer NF hollow fibers to different inorganic salts was examined by a series of nanofiltration experiments conducted under operating pressure of 2 bar. For the feed solution containing 1000 ppm $MgCl_2$, the membrane possessed a highest rejection to $MgCl_2$ of 95.6% with salt water permeability (SWP) of 15.9 LMH/bar, as shown in Table 6.

TABLE 6

Pure and mixed salt solution testing results of dual layer NF hollow fiber membranes.

| Feed Solution | TDS (ppm) | SWP (LMH/bar) | $Mg^{2+}$ rejection (%) | $Ca^{2+}$ rejection (%) | $Na^+$ rejection (%) |
|---|---|---|---|---|---|
| 1000 ppm $MgCl_2$ | 1000 | 15.6 ± 1.1 | 95.7 ± 1.6 | — | — |
| 500 ppm $MgCl_2$ + 900 ppm $CaCl_2$ + 1600 ppm NaCl | 3000 | 15.8 ± 0.4 | 94.2 ± 1.5 | 92.3 ± 1.6 | 11.7 ± 0.9 |
| 833 ppm $MgCl_2$ + 1500 ppm $CaCl_2$ + 2667 ppm NaCl | 5000 | 12.9 ± 0.7 | 89.1 ± 2.0 | 84.0 ± 2.4 | −10.6 ± 0.8 |

*tested at 2 bar, cross-flow rate 800 ml/min (velocity: 0.5 m/s)

Typical hard water streams not only exhibit high contents of hard water metal ions like $Mg^{2+}$ and $Ca^{2+}$, but also possess modest monovalent cation concentration. Water softening performance of the membrane should therefore assess the permeation of monovalent ions in addition to the rejection of divalent cations. Moreover, the feed solutions with both divalent and monovalent cations better simulate the real water softening application scenario where the interaction among different ions plays an important role in membrane separation. For the current work, the dual layer NF hollow fibers were challenged by mixed salt solutions with different compositions and concentrations of divalent and monovalent cations with total dissolved salt (TDS) ranging from 3000 to 5000 ppm, and the results are also summarized in Table 6.

It can be seen that the dual layer NF hollow fiber is able to achieve an excellent water softening performance with salt water permeability of 13.5 $l/m^2$·h·bar and $Mg^{2+}$ and $Ca^{2+}$ rejections of 87.8% and 81.8%, respectively, at 2 bar operating pressure even when the TDS in the feed solution was as high as 5000 TDS.

The rejection of hard water metal cations is influenced by the ionic strength of the feed solution. A high TDS feed with high ionic strength normally minimizes the membrane rejection due to charge repulsion so that steric hindrance dominates the separation mechanism. More specifically, the high concentration of counter-ions (CE) shielded the electric field created by the positive membrane charges from repulsing the co-ions ($Mg^{2+}$, $Ca^{2+}$) in the feed stream, which tends to reduce the $Mg^{2+}$ and $Ca^{2+}$ rejections. In addition, for low-pressure water softening, osmotic pressure difference across the membrane must be taken into consideration, as the driving force provided by the applied pressure is limited comparing to high-pressure RO and NF applications. The increased osmotic resistance induced by hard water metal ions in a high TDS feed stream would result in the decline of permeation flux. However, for the feed containing $MgCl_2$, $CaCl_2$ and NaCl in the current study, the rejection for $Na^+$ ion was negative (−10.6%), which cuts down effectively the osmotic pressure difference across the membrane because of the transfer of $Na^+$ ions to the permeate side. Such separation characteristics benefit the water softening performance of the membrane, especially when a high level of monovalent cations presents in hard water feed stream.

The comparison of the composite NF hollow fiber developed in the current work with various commercial NF flat-sheet membranes is shown in Table 7. The permeation flux of the resultant hollow fiber is superior at much lower operating pressure of 2 bar. As for salt rejection, as most commercial NF membranes possess anionic charges, they exhibit higher $Na_2SO_4$ rejection and lower $MgCl_2$ rejection comparing to the dual layer NF hollow fiber developed in the current work. The only exception is the UTC-20 membrane. It has a cationic selective skin as claimed by the manufacturer, and thus presents a high $MgCl_2$ rejection. It was noted that its performance parameters were obtained under a high operating pressure of 10 bar. It may be concluded the newly developed dual layer NF hollow fibers have great potential for water softening application.

TABLE 7

Comparison of the performance of various NF membranes.

| Membranes | Permeation flux ($l/m^2$ h) | Solute rejection (%) | | | Operating pressure (bar) | Solute concentration (ppm) | Ref. |
|---|---|---|---|---|---|---|---|
| | | $Mg^{2+}$ | $Ca^{2+}$ | $Na^+$ | | | |
| Dual layer NF hollow fiber | 31.2[a] | 95.7 | — | — | 2 | 1000 | Current work |
| | 31.6[a'] | 94.2 | 92.3 | 11.7 | 2 | 3000 (500 $MgCl_2$ + 900 $CaCl_2$ + 1600 NaCl) | |
| | 25.8[a'] | 89.1 | 84.0 | −10.6 | 2 | 5000 (833 $MgCl_2$ + 1500 $CaCl_2$ + 2667 NaCl) | |
| | | $MgCl_2$ | NaCl | $Na_2SO_4$ | | | |
| NF-40[b] | 43 | 70 | 45 | 95 | 20 | 2000 | [1] |
| NF-270[c] | 53 | — | 50 | 98 | 4.8 | 2000 | [2] |
| NTR-7450[b] | 92 | 13 | 51 | 92 | 10 | 5000 | [1] |

TABLE 7-continued

Comparison of the performance of various NF membranes.

| | | | | | | | |
|---|---|---|---|---|---|---|---|
| SU-600[b] | 28 | — | 55 | — | 3.5 | 500 | [3] |
| UTC-20[a] | 97 | 98 | 55 | 93 | 10 | 1500 | [4] |

[a]Permeation flux were obtained using MgCl$_2$ feed solution.
[a']Permeation flux were obtained using mixed salt feed solution.
[b]Permeation flux were obtained using NaCl feed solution.
[c]Permeation flux were obtained using Na$_2$SO$_4$ feed solution
Ref. [1]: M. Nystrom, L. Kaipia, S. Luque, Fouling and retention of nanofiltration membranes, Journal of Membrane Science 98 (1995) 249-262.
Ref. [2]: M. Liu, S. Yu, Y. Zhou, C. Gao, Study on the thin-film composite nanofiltration membrane for the removal of sulfate from concentrated salt aqueous: preparation and performance, Journal of Membrane Science 310 (2008) 289-295.
Ref. [3]: F. Yang, S. Zhang, D. Yang, X. Jian, Preparation and characterization of polypiperazine amide/PPESK hollow fiber composite nanofiltration membrane, Journal of Membrane Science 301 (2007) 85-92.
Ref. [4]: J. Schaep, B. Van der Bruggen, C. Vandecasteele, D. Wilms, Influence of ion size and charge in nanofiltration, Separation and Purification Technology 14 (1998) 155-162.

Example 5: Potential Applications of the Invention

Dual layer NF hollow fiber membranes desirable for water softening under low operating pressure (less than 2 bar) were successfully developed. The NF selective layer of the dual layer hollow fiber was formed through a simple chemical treatment on the outer layer of PAI material with PAAm as the cross-linking agent in an aqueous phase.

The NF selective layer has a MWCO of less than 6000 Da and exhibits positive charges. They are able to achieve a salt water permeability of 15.7 l/m$^2$·h·bar, and Mg$^{2+}$ and Ca$^{2+}$ rejections of 95.4% and 93.8%, respectively, at 2 bar operating pressure even when the TDS in the feed solution was 3000 ppm TDS. When the TDS was increased to 5000 ppm, the membrane rejections for Mg$^{2+}$ and Ca$^{2+}$ ions were still kept above 80% while the water permeability was around 13.5 l/m$^2$·h·bar at 2 bar pressure, suggesting the great potential of the newly developed composite hollow fibers for effective water softening application.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A multi-layer hollow fiber nanofiltration membrane comprising
   a) an inner layer of polyethersulfone; and
   b) an outer layer of a positively charged selective layer comprising
   a fiber substrate of poly(amide-imide) cross-linked only on its outer layer with polyallylamine, wherein the fiber substrate of poly(amide-imide) was treated with glycerol before cross-linking.

2. The multi-layer hollow fiber nanofiltration membrane according to claim 1, wherein the poly(amide-imide) has general formula (I)

wherein
R$^a$ at each occurrence is independently selected from the group consisting of optionally substituted C$_1$-C$_{20}$ alkyl, optionally substituted C$_2$-C$_{20}$ alkenyl, optionally substituted C$_2$-C$_{20}$ alkynyl, optionally substituted monocyclic, condensed polycyclic or bridged polycyclic C$_5$-C$_{20}$ aryl, optionally substituted C$_3$-C$_{20}$ mono-, or poly-cycloalkyl, optionally substituted C$_3$-C$_{20}$ mono-, or poly-cycloalkenyl; optionally substituted 2-20-membered heteroalkyl, optionally substituted 2-20-membered heteroalkenyl, optionally substituted 2-20-membered heteroalkynyl, optionally substituted 5-20-membered monocyclic, condensed polycyclic or bridged polycyclic heteroaryl, optionally substituted 3-20-membered mono-, or poly-heterocycloalkyl, and optionally substituted 3-20-membered mono-, or poly-heterocycloalkenyl; and n is an integer in the range from 20 to 1000.

3. The multi-layer hollow fiber nanofiltration membrane according to claim 2, wherein R$^a$ at each occurrence is independently selected from the group consisting of optionally substituted monocyclic, condensed polycyclic or bridged polycyclic C$_5$-C$_{20}$ aryl, and optionally substituted 5-20-membered monocyclic, condensed polycyclic or bridged polycyclic heteroaryl.

4. The multi-layer hollow fiber nanofiltration membrane according to claim 2, wherein R$^a$ in each monomer is independently selected from the group consisting of and isomers thereof.

5. The multi-layer hollow fiber nanofiltration membrane according to claim 4, wherein ratio of monomers with R$^a$= and isomers thereof to monomers with

R$^a$= and isomers thereof is about 7:3.

6. The multi-layer hollow fiber nanofiltration membrane according to claim 1, wherein the poly(amide-imide) has general formula (II)

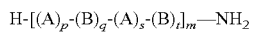 (II)

wherein

A is

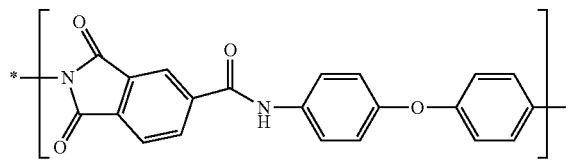

B is

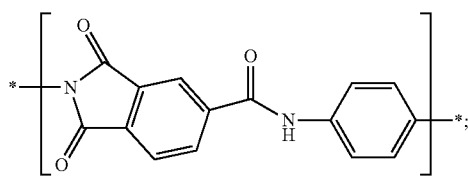

each of p, q, s, and t is independently 0, or an integer in the range of about 1 to about 10, with the proviso that at least one of p and s, and at least one of q and t is not 0; and m is an integer in the range of about 20 to 1000.

7. The multi-layer hollow fiber nanofiltration membrane according to claim 1, wherein the polyallylamine is formed from polymerization reaction comprising aliphatic ethylenically unsaturated alkylamine monomers having general formula (III)

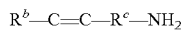 (III)

wherein $R^b$ is optionally substituted $C_1$-$C_{10}$ alkyl and $R^c$ is $(CH_2)_r$, wherein r is an integer in the range of 1 to 10.

8. The multi-layer hollow fiber nanofiltration membrane according to claim 1, wherein molecular weight of the polyallylamine is in the range of about 8000 Da to about 25000 Da.

9. The multi-layer hollow fiber nanofiltration membrane according to claim 1, wherein thickness of the positively charged selective layer is in the range of about 20 μm to about 50 μm.

10. The multi-layer hollow fiber nanofiltration membrane according to claim 1, wherein the positively charged selective layer comprising a fiber substrate of poly(amide-imide) cross-linked only on its outer layer with polyallylamine comprises units of general formula (IV)

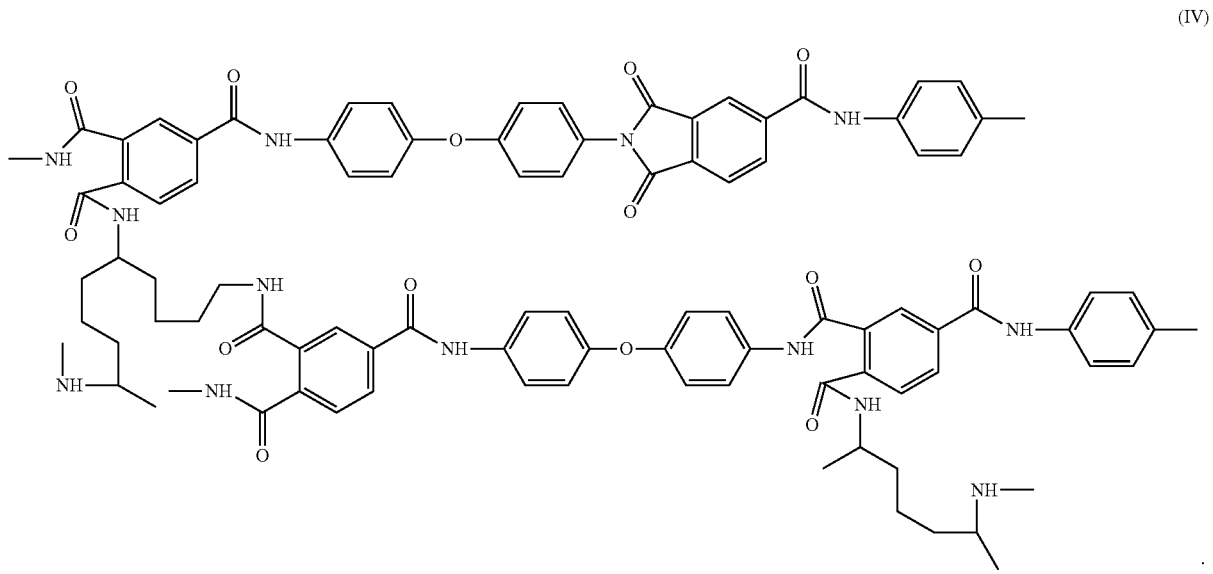

(IV)

11. A method of manufacturing a multi-layer hollow fiber nanofiltration membrane comprising an inner layer of polyethersulfone and an outer layer of a positively charged selective layer comprising a fiber substrate of poly(amide-imide) cross-linked only on its outer layer with polyallylamine, the method comprising:

a) providing a multi-layer hollow fiber nanofiltration membrane comprising an inner layer of polyethersulfone and an outer layer comprising a fiber substrate of poly(amide-imide), and b) treating the fiber substrate of poly(amide-imide) with glycerol before cross-linking the outer layer comprising the fiber substrate of poly(amide-imide) with polyallylamine to form a positively charged selective layer comprising a fiber substrate of poly(amide-imide) cross-linked only on its outer layer with polyallylamine.

12. The method according to claim 11 wherein the poly(amide-imide) has general formula (I)

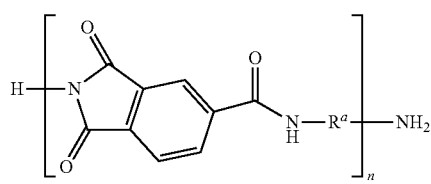

wherein

R$^a$ at each occurrence is independently selected from the group consisting of optionally substituted C$_1$-C$_{20}$ alkyl, optionally substituted C$_2$-C$_{20}$ alkenyl, optionally substituted C$_2$-C$_{20}$ alkynyl, optionally substituted monocyclic, condensed polycyclic or bridged polycyclic C$_5$-C$_{20}$ aryl, optionally substituted C$_3$-C$_{20}$ mono-, or poly-cycloalkyl, optionally substituted C$_3$-C$_{20}$ mono-, or poly-cycloalkenyl; optionally substituted 2-20-membered heteroalkyl, optionally substituted 2-20-membered heteroalkenyl, optionally substituted 2-20-membered heteroalkynyl, optionally substituted 5-20-membered monocyclic, condensed polycyclic or bridged polycyclic heteroaryl, optionally substituted 3-20-membered mono-, or poly-heterocycloalkyl, and optionally substituted 3-20-membered mono-, or poly-heterocycloalkenyl; and n is an integer in the range from 20 to 1000.

13. The method according to claim 11, wherein the positively charged selective layer comprising a fiber substrate of poly(amide-imide) cross-linked only on its outer layer with polyallylamine comprises units of general formula (IV)

14. The method according to claim 11, wherein the multi-layer hollow fiber membrane is prepared by co-spinning with a triple orifice spinneret comprising a) extruding a bore liquid through an inner channel of the triple orifice spinneret;

b) extruding an inner doping liquid through a middle channel of the triple orifice spinneret, the inner doping liquid comprising 10 to 17 wt % polyethersulfone, 10 to 15 wt % poly(ethylene glycol), 2 to 7 wt % lithium chloride, and 61 to 78 wt % n-methyl-2-pyrrolidone; and c) extruding an outer doping liquid through an outer channel of the triple orifice spinneret, the outer doping liquid comprising 15 to 20 wt % polyamide-imide and 65 to 85 wt % n-methyl-2-pyrrolidone.

15. The method according to claim 14, wherein co-spinning with a triple orifice spinneret is carried out at a temperature in the range of about 20° C. to about 30° C.

16. The method according to claim 11, wherein cross-linking the outer layer comprising a fiber substrate of poly(amide-imide) with the polyallylamine comprises immersing the outer layer comprising a fiber substrate of poly(amide-imide) in an aqueous solution comprising polyallylamine at a temperature in the range of about 50° C. to about 80° C.

17. The method according to claim 16, wherein concentration of polyallylamine in the aqueous solution is in the range of about 0.5 wt % to about 2 wt %.

18. The method according to claim 16, wherein immersing the outer layer comprising a fiber substrate of poly(amide-imide) in an aqueous solution comprising polyallylamine is carried out for a time period in the range of about 10 minutes to about 60 minutes.

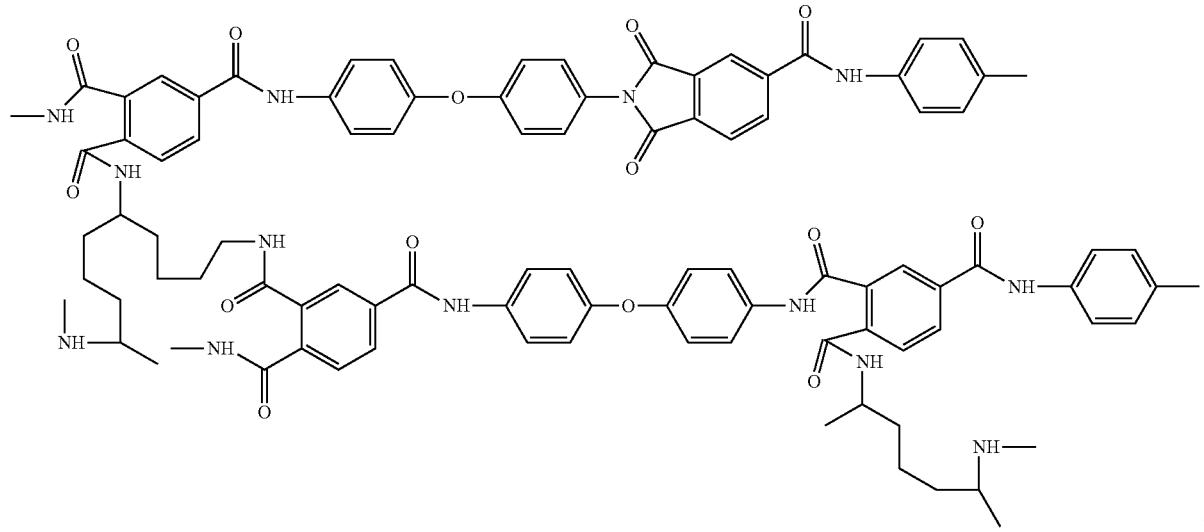

19. The method according to claim 14, wherein the outer doping liquid further comprises 1 to 5 wt % poly(ethylene glycol), 1 to 5 wt % lithium chloride, 1 to 5 wt % water, or combinations thereof.

* * * * *